United States Patent
Heizenroeder (10) Patent No.: US 11,035,713 B2
(45) Date of Patent: Jun. 15, 2021

(54) WATER METERS HAVING INTEGRATED PRESSURE REGULATING SYSTEMS AND RELATED METHODS

(71) Applicant: Sensus Spectrtum, LLC, Morrisville, NC (US)

(72) Inventor: Christian Heizenroeder, Durham, NC (US)

(73) Assignee: Sensus Spectrum LLC, Morrisville, NC (US)

( * ) Notice: Subject to any disclaimer, the term of this patent is extended or adjusted under 35 U.S.C. 154(b) by 331 days.

(21) Appl. No.: 15/947,990

(22) Filed: Apr. 9, 2018

(65) Prior Publication Data
US 2018/0292248 A1   Oct. 11, 2018

Related U.S. Application Data

(60) Provisional application No. 62/483,604, filed on Apr. 10, 2017.

(51) Int. Cl.
*G01F 15/06* (2006.01)
*G01F 5/00* (2006.01)
(Continued)

(52) U.S. Cl.
CPC ............ *G01F 15/063* (2013.01); *E03B 7/075* (2013.01); *G01D 4/004* (2013.01); *G01D 5/50* (2013.01);
(Continued)

(58) Field of Classification Search
CPC ........ G01F 15/063; G01F 5/005; G01F 15/00; G01F 15/14; G01F 25/0007; E03B 7/075;
(Continued)

(56) References Cited

U.S. PATENT DOCUMENTS 3,990,299 A   11/1976   Coffman
4,768,548 A    9/1988   Maurer
(Continued)

FOREIGN PATENT DOCUMENTS

CN   203049674 U  *  7/2013
CN   203049674 U     7/2013
(Continued)

OTHER PUBLICATIONS

Notification of Transmittal of the International Search Report and the Written Opinion of the International Searching Authority, or the Declaration, PCT/US2018/026658, dated Jul. 10, 2018, 14 pages.
(Continued)

*Primary Examiner* — Raymond L Nimox
(74) *Attorney, Agent, or Firm* — Stanek Lemon Crouse & Meeks, PA (57) ABSTRACT

Meters including a pressure regulating systems are provided. The pressure regulating system includes a pressure sensor configured to sense pressure of water flowing through the meter; an actuator coupled to the pressure sensor; an electronics module configured to receive pressure information related sensed pressure from the actuator and process the received pressure information; and a radio module coupled to the meter and configured to receive the processed sensor information from the electronics module, communicate the processed sensor information to a remote location and receive pressure adjustment information from the remote location. The received pressure adjustment information is used to adjust water pressure in the meter from the remote location.

15 Claims, 4 Drawing Sheets

(51) Int. Cl.
*G01D 4/00* (2006.01)
*G01D 5/50* (2006.01)
*G01F 25/00* (2006.01)
*G01D 18/00* (2006.01)
*G06Q 50/06* (2012.01)
*E03B 7/07* (2006.01)
*G01F 15/00* (2006.01)
*G05D 16/20* (2006.01)
*G01F 15/14* (2006.01)

(52) U.S. Cl.
CPC .......... *G01D 18/006* (2013.01); *G01F 5/005* (2013.01); *G01F 15/00* (2013.01); *G01F 25/0007* (2013.01); *G05D 16/2013* (2013.01); *G01F 15/14* (2013.01); *G06Q 50/06* (2013.01)

(58) Field of Classification Search
CPC ........ G01D 4/004; G01D 5/50; G01D 18/006; G05D 16/2013; G06Q 50/06
See application file for complete search history.

(56) References Cited

U.S. PATENT DOCUMENTS

| | | | |
|---|---|---|---|
| 5,954,089 A | 9/1999 | Seymour | |
| 6,994,309 B2 | 2/2006 | Fernandez-Sein | |
| 7,314,059 B2 | 1/2008 | Schuetze | |
| 8,176,936 B2 | 5/2012 | Naganuma | |
| 8,905,063 B2 | 12/2014 | Young | |
| 9,563,207 B2 | 2/2017 | Aughton | |
| 9,863,425 B2 | 1/2018 | Kallesoe | |
| 10,006,555 B2 | 6/2018 | Arazi | |
| 2002/0189362 A1 | 12/2002 | Havlena | |
| 2006/0076426 A1 | 4/2006 | Schuetze | |
| 2006/0272830 A1* | 12/2006 | Fima | G01M 3/2807 169/16 |
| 2007/0284293 A1* | 12/2007 | Pitchford | G01D 4/004 210/85 |
| 2008/0150750 A1 | 6/2008 | Parris | |
| 2010/0132803 A1* | 6/2010 | Fima | E03B 7/071 137/79 |
| 2010/0133258 A1* | 6/2010 | Fima | F24H 9/16 219/482 |
| 2010/0168927 A1 | 7/2010 | Burrows | |
| 2010/0212752 A1* | 8/2010 | Fima | F24H 9/2007 137/87.03 |
| 2011/0178644 A1 | 7/2011 | Picton | |
| 2011/0303310 A1 | 12/2011 | Klicpera | |
| 2013/0153798 A1 | 6/2013 | Kucera | |
| 2014/0238511 A1 | 8/2014 | Klicpera | |
| 2014/0277764 A1* | 9/2014 | Burt | G05B 15/02 700/276 |
| 2014/0343734 A1 | 11/2014 | Meyer | |
| 2015/0057816 A1 | 2/2015 | Schick | |
| 2016/0132061 A1 | 5/2016 | Palmer | |
| 2016/0161310 A1 | 6/2016 | Leaders | |
| 2017/0196204 A1 | 7/2017 | Willis | |
| 2017/0285665 A1* | 10/2017 | Nunally | G01F 15/063 |
| 2018/0230681 A1 | 8/2018 | Poojary | |
| 2018/0292248 A1 | 10/2018 | Heizenroeder | |
| 2019/0101411 A1 | 4/2019 | Davis | |
| 2019/0135657 A1 | 5/2019 | Yates | |
| 2019/0234786 A1 | 8/2019 | Klicpera | |
| 2020/0011722 A1 | 1/2020 | Romer | |

FOREIGN PATENT DOCUMENTS

| | | | |
|---|---|---|---|
| CN | 103243775 A | 8/2013 | |
| WO | WO 2014/040823 A1 | 3/2014 | |
| WO | WO-2014040823 A1 * | 3/2014 | ............... E03B 7/08 |

OTHER PUBLICATIONS

Notification Concerning Transmittal of International Preliminary Report on Patentability, PCT/US2018/026658, dated Oct. 15, 2019, 9 pages.

International Search Report and Written Opinion, PCT/US2020/012665, dated Mar. 1, 2020, 10 pages.

* cited by examiner

WATER METERS HAVING INTEGRATED PRESSURE REGULATING SYSTEMS AND RELATED METHODS

CLAIM OF PRIORITY

The present application claims priority to U.S. Provisional Application No. 62/483,604, filed Apr. 10, 2017, entitled Water Meter Having Integrated Pressure Reducing Value, the content of which is hereby incorporated herein by reference as if set forth in its entirety.

FIELD

The present inventive concept relates generally to water meters and, more particularly, to controlling pressure within water meters.

BACKGROUND

Regulating house water pressure is currently a manual process that typically requires a lot of resources and manpower. In particular, when water pressure needs to be adjusted, a contractor is typically hired to come to the house, crawl under the house and adjust the water pressure to a desired level by, for example, adjusting the pressure regulation valve (PRV). If the customer is not satisfied with the water pressure, the contractor generally must return to the home of the customer and repeat the process.

SUMMARY

Some embodiments of the present inventive concept provide meters including a pressure regulating system. The pressure regulating system includes a pressure sensor configured to sense pressure of water flowing through the meter; an actuator in the meter housing; an electronics module coupled to the actuator and configured to receive pressure information related sensed pressure from the pressure sensor and process the received pressure information; and a radio module coupled to the meter and configured to receive the processed sensor information from the electronics module, communicate the processed sensor information to a remote location and receive pressure adjustment information from the remote location. The received pressure adjustment information is used to adjust water pressure using the actuator in the meter from the remote location.

In further embodiments, the pressure regulating system may further include a temperature sensor. The electronics module may be further configured to receive temperature information from the temperature sensor and process the received temperature information along with the received pressure information.

In still further embodiments, the received pressure adjustment information may instruct the electronics module to one of increase water pressure of the water flowing through the meter; decrease water pressure of the water flowing through the meter; and shut off the water flowing through the meter.

In some embodiments, the electronics module may include Advanced metering infrastructure (AMI) components.

In further embodiments, the electronic module may be further configured to store the received pressure information and process the received pressure information to provide the processed pressure information to the remote location via a radio module.

In still further embodiments, the meter may further include a meter housing and the radio module may be one of inside the meter housing and separate from the meter housing. The meter housing may be an existing housing currently used for meters.

Some embodiments of the present inventive concept provide a water meter including a housing, a pressure sensor configured to sense pressure of water flowing through the water meter, and an integrated pressure control valve inside the housing. The integrated pressure control valve is configured to receive instructions from a remote location based on the sensed pressure of water flowing through the water meter to increase and/or decrease, water pressure of water flowing through the water meter using an actuator in the housing.

In further embodiments of the present inventive concept, the water meter may further include an actuator and an electronics module. The actuator may be coupled to the integrated pressure control valve configured to measure pressure of the water flowing through the water meter. The electronics module may be coupled to the actuator and configured to receive the measured pressure of the water flowing through the meter from the pressure sensor and communicate the received pressure of the water flowing through the meter to a remote location via a radio module coupled to the meter. The actuator may be configured to receive the instructions to increase and/or decrease water pressure of water flowing through the water meter and increase and/or decrease water pressure responsive thereto.

In still further embodiments, the actuator may include one of a motor, a coil and other type of actuator.

In some embodiments, the radio module is one of integrated into the housing and separate from the housing.

In further embodiments, the meter may further include a temperature sensor coupled to the electronics module. The electronics module may be further configured to receive temperature information from the temperature sensor and communicate the received temperature information along with the pressure of the water flowing through the meter to a remote location via a radio module coupled to the meter.

Still further embodiments of the present inventive concept provide methods of remotely adjusting pressure in a water meter. The methods include sensing pressure of water flowing through the water meter; receiving the sensed pressure of the water flowing through the water meter at an electronics module in the water meter; processing the received sensed pressure at the electronics module to provided processed pressure information; providing the processed pressure information to a remote location via a radio module; receiving pressure adjustment information from the remote location via the radio module; and adjusting the pressure of the water flowing through the water meter based on the received pressure adjustment information from the remote location.

In some embodiments, the method may further include sensing a temperature of the water flowing through the water meter; receiving the sensed temperature of the water flowing through the water meter at the electronics module in the water meter; processing the received sensed temperature at the electronics module to provide processed temperature information; providing the processed temperature information to the remote location via a radio module with the processed pressure information; receiving pressure adjustment information from the remote location via the radio module responsive to both the processed pressure information and the processed temperature information; and adjusting the pressure of the water flowing through the water meter based on the received pressure adjustment information.

In further embodiments, adjusting the pressure of the water flowing through the water meter may further include one of increasing water pressure of the water flowing through the meter; decreasing water pressure of the water flowing through the meter; and shutting off the water flowing through the meter.

In still further embodiments, receiving the sensed pressure of the water flowing through the water meter at an electronics module in the water meter may be followed by storing the sensed pressure of the water flowing through the water meter at the electronics module.

DETAILED DESCRIPTION

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, regulating water pressure into the home is currently done by an onsite contractor that physically changes the water pressure in the home at the home site. This can be very expensive and time consuming. Thus, some embodiments of the present inventive concept incorporate a pressure regulating system into the water meter itself. Incorporating pressure regulating system into the meter as discussed herein may make pressure regulation controllable remotely, for example, from an office desk or even through an automated software algorithm.

As used herein, a "pressure regulating system" refers to one or more elements associated with a water meter that allows pressure to be increased and/or increased from a remote location based on information received from the meter itself.

Figure 1:
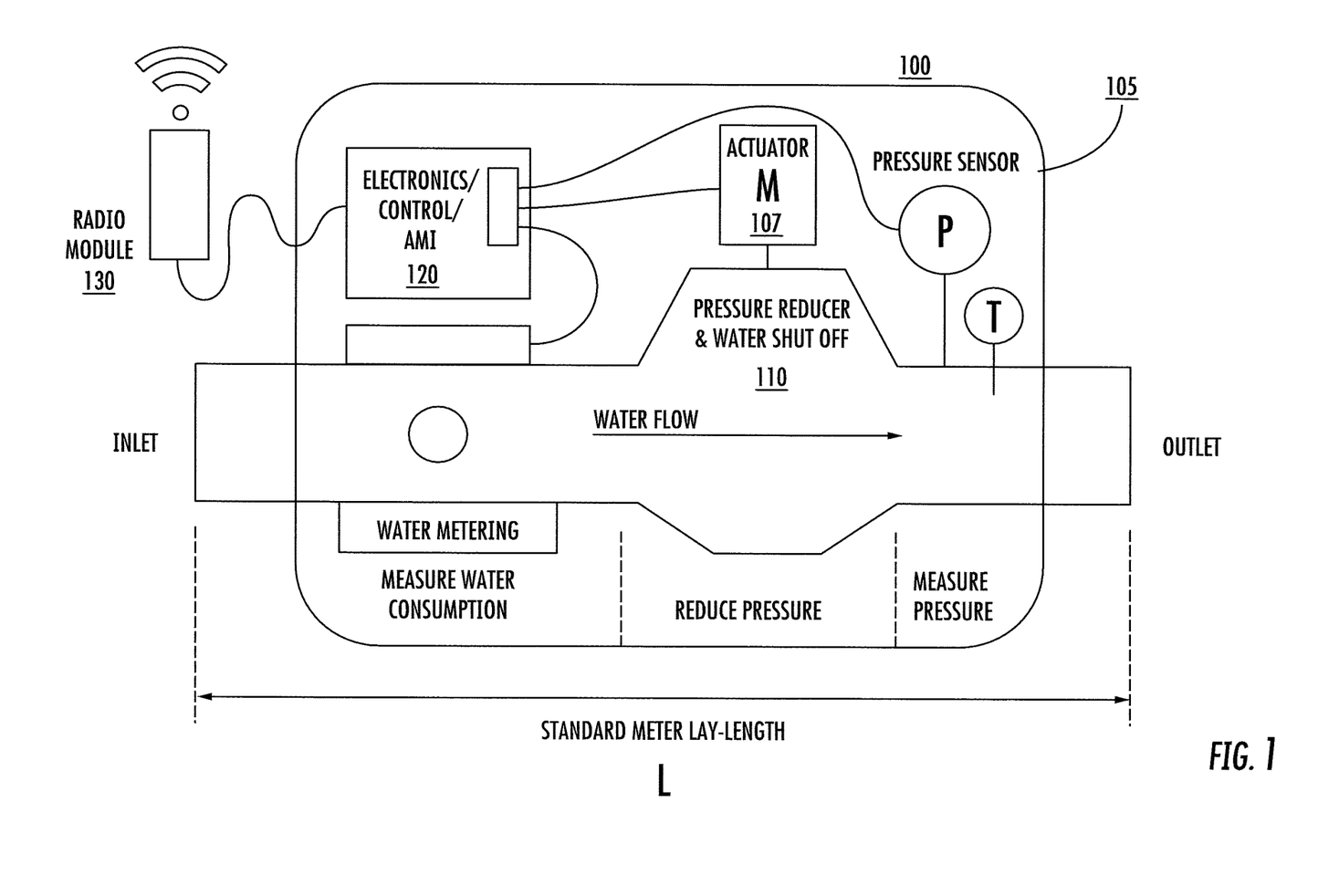
FIG. 1 is a block diagram of a water meter configured in accordance with some embodiments of the present inventive concept.

Referring now to FIG. 1, a water meter 100 including a pressure regulating system in accordance with some embodiments of the present inventive concept will be discussed. As illustrated in FIG. 1, the water meter 100 includes a housing 105. The housing 105 may be made of any material suitable for water meters without departing from the scope of the present inventive concept. The housing 105 includes a pressure control valve 110, an actuator 107, and electronics 120 in communication with a radio module 130. In some embodiments, the pressure regulating system includes some combination of the pressure control valve 110, the actuator 107, the electronics 120 and the radio module 130. It will be understood that embodiments illustrated in FIG. 1 are provided as examples only and embodiments of the present inventive concept are not limited thereto. For example, more or less elements may be included in the pressure regulating system or elements may be combined without departing from the scope of the present inventive concept.

Figure 2:
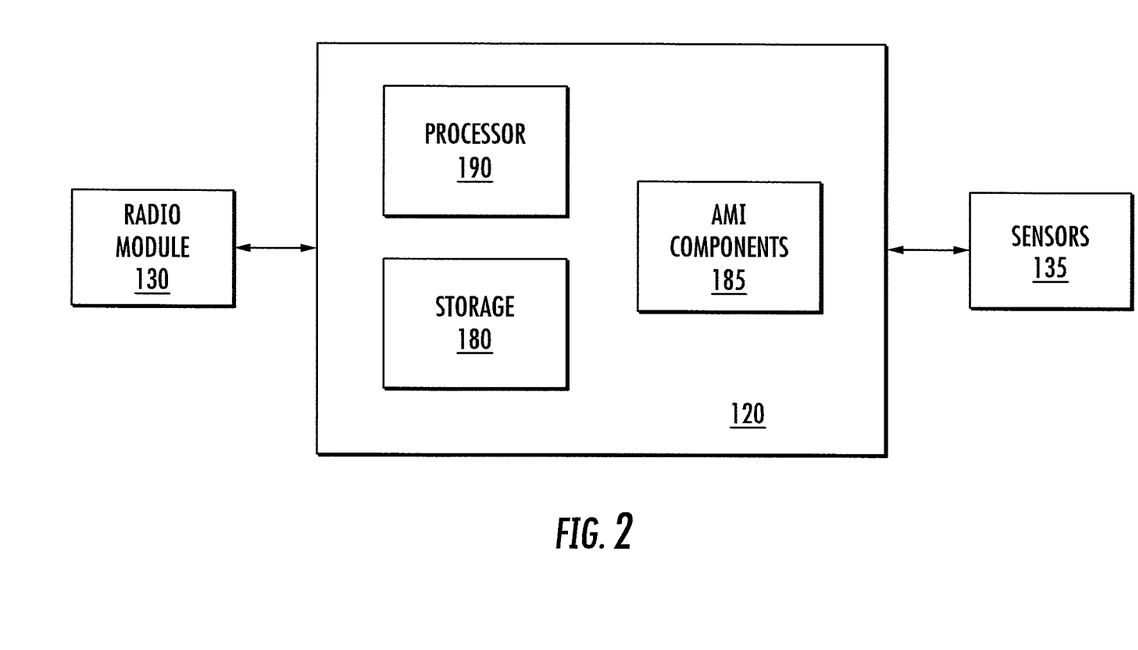
FIG. 2 is a simplified block diagram illustrating electronics and control in a meter in accordance with some embodiments of the present inventive concept.

The electronics 120 may include elements configured to receive information from the actuator M 107, temperature sensor T, pressure sensor P and the like, process and/or store the information therein and communicate the information to a remote location via the radio module 130. As illustrated in FIG. 2 the electronics 120 may include storage 180, a processor 190 configured to receive and process the information from the various sensors 135 in the meter 100 and Advanced metering infrastructure (AMI) components 185. AMI is an architecture for automated, two-way communication between a smart utility meter with an Internet protocol (IP) address and a utility company. A "smart" meter is a meter having the capability to communicate with other remote meters and devices. It will be understood that FIG. 2 is a simplified block diagram of the electronics 120 and embodiments of the present inventive concept are not limited to the configuration therein.

Referring again to FIG. 1, water flows in through meter 100, in through the INLET into the housing 104 and out through the OUTLET. As will be discussed, embodiments of the present inventive concept allow the pressure of the water flowing through the meter 100 to be regulated from a remote location, in contrast to conventional systems discussed above. In particular, the water meter 100 includes an integrated pressure control valve 110 inside the housing 105 of the water meter 100. The pressure control valve 110 may be used to increase and/or decrease water pressure remotely responsive to information received from the water meter itself. As illustrated, the pressure control valve 110 is coupled to an actuator M 107, for example, a motor, coil, or other type of actuator that is linked to the meter's electronics 120. The actuator M 107 measures/senses the pressure of the water flowing through the meter 100 (INLET to OUTLET) and communicates this pressure information the electronics 120 within the meter 100. It will be understood that the information received at the electronics 120 is not limited to pressure information. As discussed above, other sensed/measured information related to the meter 100 may be received from sensors, such as a temperature sensor T, without departing from the scope of the present inventive concept.

The electronics 120 communicate with the radio module 130. The sensed/measured information communicated to the electronics 120 in the meter 100 may be processed (190, FIG. 2) and communicated to a remote meter or device using the radio module 130. Thus, in accordance with some embodiments discussed herein, the water consumption of the meter 100 may be increased/decreased from a remote location if, for example, customers are not paying their bills, the water pressure level is not at a desired level to provide a certain pressure level to houses, and the like. In some embodiments, a pressure regulation valve (PRV) may not be needed in the individual homes or may be provided for emergency purposes only. It will be understood that although the radio module 130 is shown as a separate device in FIG. 1, embodiments of the present inventive concept are not limited to this configuration. For example, the radio module may be incorporated into the electronics of the meter 120 without departing from the scope of the present inventive concept.

In some embodiments, meters discussed herein may combine the following features in one: a water meter; a PRV; a pressure sensor (P of FIG. 1); and optional temperature sensor (T of FIG. 1). All elements in the water meter 100 may be capable of communicating with the radio module 130, i.e. sending and receiving data related to the functionality of the meter including pressure and temperature information. Thus, the meter 100 may be controlled remotely, for example, desired values can be set and read remotely.

As further illustrated in FIG. 1, in some embodiments, a pressure sensor (P), a temperature sensor (T) and the like may fit into the standard water meter pit, i.e. the standard meter housing. The housing 105 may have a length L, which may differ depending on the type of meter. Including a pressure regulating system as discussed herein in the meter itself may simplify plumbing and will likely increase customer and water provider satisfaction by providing, for example, well-adjusted water pressure, protection from over pressure, the ability to reduce pressure when a water bill is not paid, and the like.

Water meters in accordance with some embodiments discussed herein are configured to measure water consumption; water temperature and/or water pressure and reduce/increase the pressure down/up to a level where less/more water can be consumed. The meter may also regulate the pressure in the consumer's house or corporate environment. For example, by default, it could be set to a certain level such as 60 pounds per square inch (psi). The sensors could detect the pressure and protect the plumbing in the house/building from being exposed to overpressure from, for example, an increase in pressure caused by the utilities and other incidents that cause an increase in water pressure. Pressure is the driving energy in the water pipes. Reducing the water pressure, therefore, reduces the ability to consume/waste it.

Embodiments of the present inventive concept may be very useful with magnetic inductive meters, such as the ALLY meter provided by Sensus, having a shut off valve. ALLYs three-state valve is more a flow reducing device. The issue with this kind of device is that its primary purpose is to restrict flow (when in reduced state) and that it will equalize the pressure on either side of the meter when there is no water flow. Thus, the ALLY with the three state-valves is more a flow limiting device. Of course it also reduces pressure due to the high pipe diameter and orifice ratio when water is flowing. The problem is that the orifice size is fixed and won't fit all applications, for example, multistory houses that present elevation issues.

Embodiments of the present inventive concept can be used to reduce the pressure down to a desired level where very little water can be consumed. The amount the pressure is reduced can be controlled and adjusted remotely. The built-in pressure sensor (P) illustrated in FIG. 1 indicates the available pressure after the regulator, which is the pressure available to the customer.

As discussed above, the pressure reducing valve illustrated in FIG. 1 may be driven by an actuator M 107 that is linked to the electronics 120 in the meter. The benefit of the adjustable pressure is that the pressure after the meter can be set to a certain value remotely. This feature makes this apparatus fit for most applications and overcomes the geo-elevation challenge that ALLY with the three state-valve presents.

Thus, some embodiments of the present inventive concept provide a water meter, for example, a magnetic inductive water meter like iPerl or ALLY that has an integrated pressure reducing valve, pressure sensor and optional temperature sensor. This pressure reducing valve may be used to control water pressure, reduce flow and to possibly prevent over pressure remotely. Some embodiments of the present inventive concept are configured to fit within a standard water meter lay length/meter size, thus, requiring very little change in design of the water meter pit/house plumbing. However, it will be understood that embodiments of the present inventive concept are not limited to this configuration. Totally new meters may be provided without departing from the scope of the present inventive concept.

Figure 3:
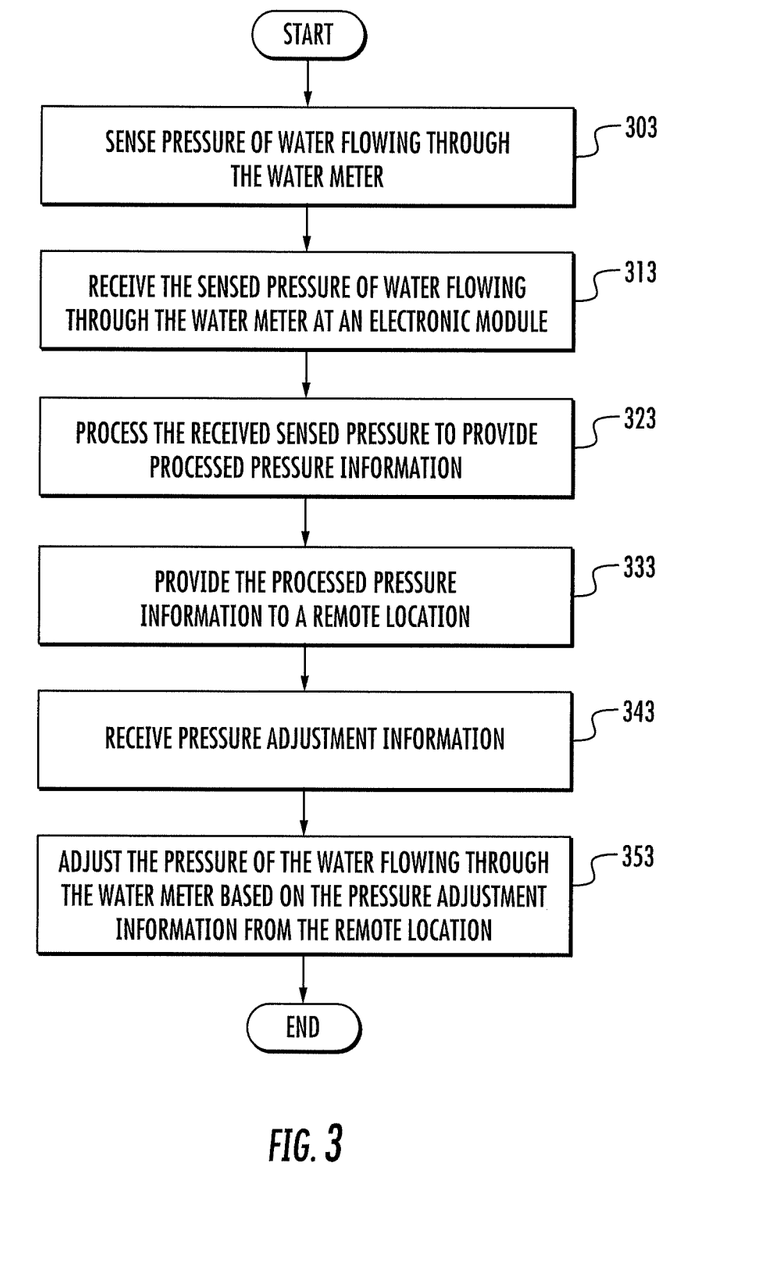
FIG. 3 is a flowchart illustrating operations of a pressure regulation system in accordance with some embodiments of the present inventive concept.

Referring now to FIG. 3, a flowchart illustrating operations of water meter having an integrated pressure control valve in accordance with some embodiments will be discussed. Operations for remotely adjusting pressure in a water meter begin at block 303 by sensing pressure of water flowing through the water meter. The pressure may be sensed by a pressure sensor included in the water meter. Furthermore, embodiments of the present inventive concept are not limited to sensing pressure, for example, a temperature sensor may also be included in the meter without departing from the scope of the present inventive concept.

The sensed pressure of the water flowing through the water meter may be received at an electronics module in the water meter (block 313). The sensed pressure is provided to the electronics module using an actuator as discussed above. The received sensed pressure is processed at the electronics module to provided processed pressure information (block 323). For example, the received sensed pressure may be transformed into data that is consumable by the ultimate destination of the processed pressure information. The processed pressure information is provided to a remote location via a radio module (block 333). Responsive to the processed pressure information, the remote location provides pressure adjustment information, which is received from the remote location via the radio module (block 343). The pressure of the water flowing through the water meter is adjusted based on the received pressure adjustment information from the remote location (block 353).

As discussed above, in some embodiments, other sensors are provided in the meter. In these embodiments, the other sensed data, for example, temperature data, may be provided to the electronics module along with the pressure data. This other sensed data may be used along with the pressure data to provide the pressure adjustment data.

Adjusting the pressure of the water flowing through the water meter may include one of increasing water pressure of the water flowing through the meter; decreasing water pressure of the water flowing through the meter; and shutting off the water flowing through the meter. In some embodiments, the electronics module may be configured to store the information received from the various sensors before processing the information to send to the remote location.

Figure 4:
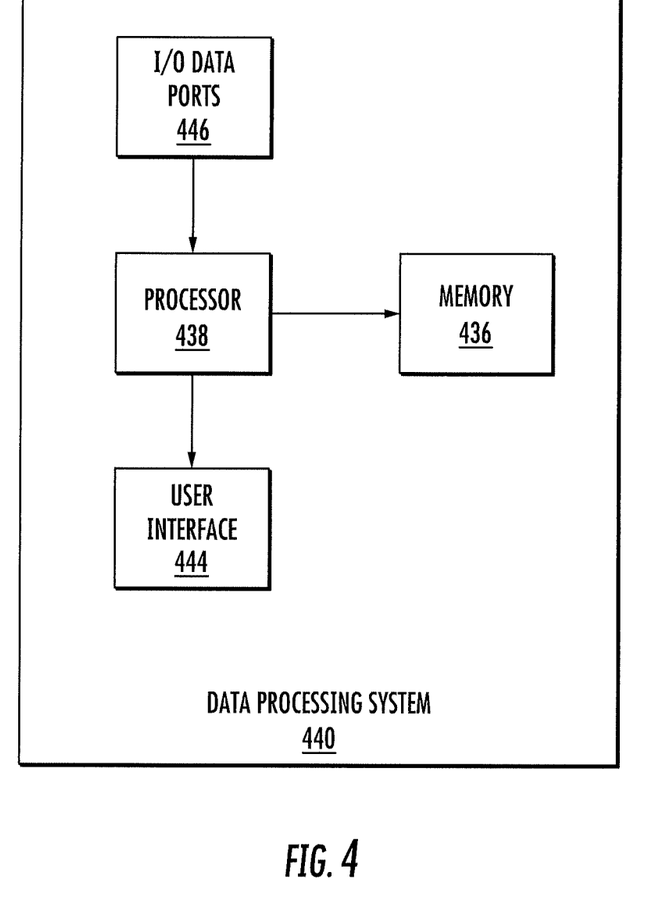
FIG. 4 is a block diagram illustrating a data processing system for use in accordance with some embodiments of the present inventive concept.

As discussed above, some aspects of the present inventive concept may be implemented by a data processing system. The data processing system may be included in any of the devices discussed herein without departing from the scope of the present inventive concept. For example, the data processing system may be included in the electronics 120 of the meter as discussed above. Exemplary embodiments of a data processing system 440 configured in accordance with embodiments of the present inventive concept will be discussed with respect to FIG. 4. The data processing system 440 may include a user interface 444, including, for example, input device(s) such as a keyboard or keypad, a display, a speaker and/or microphone, and a memory 436 that communicate with a processor 438. The data processing system 440 may further include I/O data port(s) 446 that also communicates with the processor 438. The I/O data ports 446 can be used to transfer information between the data processing system 440 and another computer system or a network using, for example, an Internet Protocol (IP) connection. These components may be conventional components such as those used in many conventional data processing systems, which may be configured to operate as described herein.

As discussed briefly above, providing a pressure regulating system in the meter in accordance with embodiments discussed herein may be very beneficial for the utility industry as flow and pressure may be controlled remotely and water may be shut off when consumer is not paying or there is a leak. Embodiments of the present inventive concept may be used to protect houses from over pressure. It may also allow water utilities to control pressure remotely without driving to the meter, which may lead to a huge cost savings. Pressure adjustments may be sold as an additional service.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A water meter including a water meter housing, the water meter housing including a pressure regulating system, the pressure regulating system comprising:
   a pressure sensor, in the water meter housing, that senses pressure of water flowing through the water meter housing;
   an actuator in the water meter housing;
   an electronics module, in the water meter housing coupled to the actuator, wherein the electronics module receives pressure information related to sensed pressure from the pressure sensor and processes the received pressure information; and
   a radio module in the water meter housing and configured to receive the processed sensor information from the electronics module, communicate the processed sensor information to a remote location and receive pressure adjustment information from the remote location, the received pressure adjustment information being used to adjust water pressure using the actuator in the meter from the remote location,
   wherein the water meter comprises a magnetic inductive water meter that measures water consumption and water pressure and adjusts the pressure in the magnetic inductive water meter up and down to increase or decrease water consumption.

2. The meter of claim 1, wherein the pressure regulating system further comprises a temperature sensor in the water meter housing and wherein the electronics module is further configured to receive temperature information from the temperature sensor and process the received temperature information along with the received pressure information.

3. The meter of claim 1, wherein the received pressure adjustment information instructs the electronics module to one of increase water pressure of the water flowing through the meter; decrease water pressure of the water flowing through the meter; and shut off the water flowing through the meter.

4. The meter of claim 1, wherein the electronics module comprises Advanced metering infrastructure (AMI) components.

5. The meter of claim 1, wherein the electronic module is further configured to store the received pressure information and process the received pressure information to provide the processed pressure information to the remote location via a radio module.

6. The meter of claim 1, wherein the water meter housing is an existing housing currently used for meters.

7. A water meter comprising:
   a water meter housing;
   a pressure sensor in the water meter housing that senses pressure of water flowing through the water meter; and
   an integrated pressure control valve inside the water meter housing, the integrated pressure control valve configured to receive instructions from a remote location based on the sensed pressure of water flowing through the water meter to increase and/or decrease water pressure of water flowing through the water meter using an actuator in the water meter housing,
   wherein the water meter comprises a magnetic inductive water meter that measures water consumption and water pressure and adjusts the pressure in the magnetic inductive water meter up and down to increase or decrease water consumption.

8. The meter of claim 7, wherein the water meter further comprises:

an electronics module coupled to the actuator in the water meter housing that receives the sensed pressure of the water flowing through the meter from the pressure sensor and communicates the received pressure of the water flowing through the meter to a remote location via a radio module in the water meter housing, wherein the actuator is configured to receive the instructions to increase and/or decrease water pressure of water flowing through the water meter and increase and/or decrease water pressure responsive thereto.

9. The meter of claim 8, wherein the actuator comprises one of a motor, a coil and other type of actuator.

10. The meter of claim 8, further comprising a temperature sensor in the water meter housing coupled to the electronics module, wherein the electronics module is further configured to receive temperature information from the temperature sensor and communicate the received temperature information along with the pressure of the water flowing through the meter to a remote location via a radio module coupled to the meter.

11. A method of remotely adjusting pressure in a magnetic inductive water meter, the magnetic inductive water meter comprising a water meter housing including a pressure sensor, a temperature sensor, an actuator, an electronics module and a radio module therein, the method comprising:

sensing pressure of water flowing through the water meter using the pressure sensor;

receiving the sensed pressure of the water flowing through the water meter at the electronics module in the water meter;

processing the received sensed pressure at the electronics module to provide processed pressure information;

providing the processed pressure information to a remote location via the radio module;

receiving pressure adjustment information from the remote location via the radio module; and adjusting the pressure of the water flowing through the water meter based on the received pressure adjustment information from the remote location.

12. The method of claim 11, further comprising:

sensing a temperature of the water flowing through the water meter using the temperature sensor;

receiving the sensed temperature of the water flowing through the water meter at the electronics module in the water meter;

processing the received sensed temperature at the electronics module to provide processed temperature information;

providing the processed temperature information to the remote location via a radio module with the processed pressure information;

receiving pressure adjustment information from the remote location via the radio module responsive to both the processed pressure information and the processed temperature information; and adjusting the pressure of the water flowing through the water meter based on the received pressure adjustment information.

13. The method of claim 11, wherein adjusting the pressure of the water flowing through the water meter comprises one of:

increasing water pressure of the water flowing through the meter;

decreasing water pressure of the water flowing through the meter; and shutting off the water flowing through the meter.

14. The method of claim 11, wherein the electronics module comprises Advanced metering infrastructure (AMI) components.

15. The method of claim 11, wherein receiving the sensed pressure of the water flowing through the water meter at an electronics module in the water meter is followed by storing the sensed pressure of the water flowing through the water meter at the electronics module.

* * * * *